_United States Patent Office_

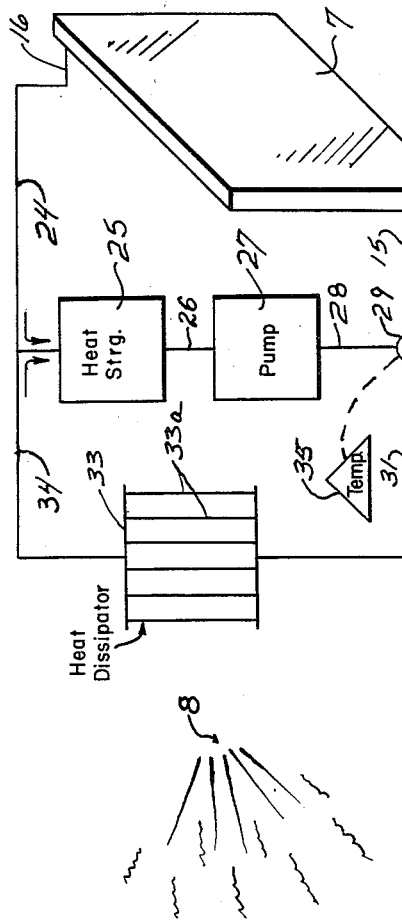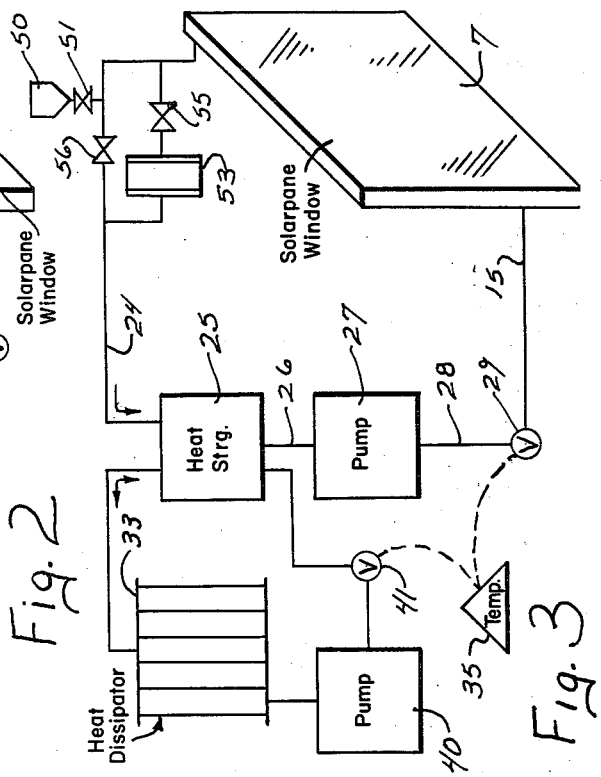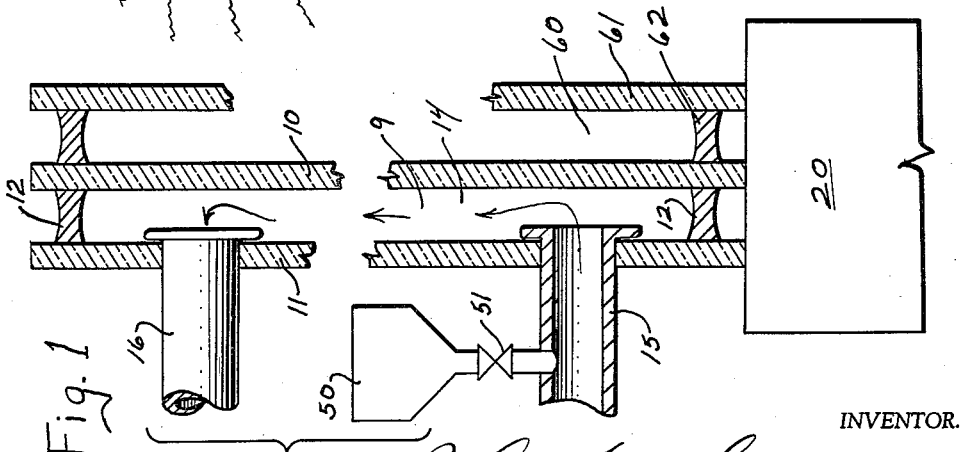

3,107,052
Patented Oct. 15, 1963

3,107,052
RADIATION COLLECTORS
Joel F. Garrison, San Jose, Calif.
(1174 Denver Drive, Campbell, Calif.)
Filed May 8, 1959, Ser. No. 812,034
8 Claims. (Cl. 237—1)

This invention relates to thermal radiation collecting apparatus and particularly concerns solar or other heat collectors which are substantially transparent.

An object of the invention is to provide improved radiation collector-dissipators.

An additional object is to provide a transparent radiation collector-dissipator which has a novel construction.

An additional object is to provide an improved wall closure for a building.

An additional object is to disclose the construction of a transparent solar heat collector-dissipator wall for buildings.

An additional object is to provide an improved system for solar heating a building.

An additional object is to provide an improved system for determining the kinds and intensities of radiation which are permitted to pass a substantially transparent panel such as a window.

Another object is to provide an improved method of heating a building.

Other objects will become apparent as the description proceeds.

In order that my invention may be practiced by others it will be described in terms of express embodiments, given by way of example only, and with reference to the accompanying drawings in which:

FIGURE 1 is a cross-sectional view of a radiation collector-dissipator showing the fluid connections thereto.

FIGURE 2 is a schematic drawing of a system for solar heating a building.

FIGURE 3 is a schematic drawing of another system for solar heating a building.

Solar heated buildings presently available have had limited acceptance by the buying and building public. One reason for this is that the prior art radiation collectors are conspicuously placed at or above or below the main floor level of the building in plain view. This has necessitated unconventional and even unsightly appearing buildings which receive limited public acceptance.

The heat collectors for a building, according to any invention, comprise the windows which are located in the walls of the building. The window or collector area of the building may therefore, be varied within wide limits as determined by architectural and climatic considerations, without departing from the building appearances which are accepted.

I propose windows having dual panes which are separated to allow a fluid to pass between them. The fluid would normally be transparent but could contain substances which would enhance the heat absorbing or dissipating property, or the light and radiation filtering properties of the fluid. The fluid absorbs solar heat while in the window and moves by convection currents or by pumping in a circulation system. The system would normally include a heat storage or a heat exchanger device which forms a part of the system for heating the building. The movement of the substantially transparent fluid between the dual-panes is not detectable and buildings could be constructed to include this form of radiation collectors without having to depart from accepted architectural forms.

Ornamental effects are achieved by introducing substances such as dyes, flakes of metal, colored solid particles and gas bubbles, into the fluid which circulates through the dual pane windows.

My invention can be incorporated in the construction of cubicles for observing sources of intense thermal radiation, such as open hearth furnaces. The cubicle is built to have a duel pane window in which substantially transparent heat absorbing fluid is circulated. Various substances could be added to the fluid to enhance the inherent heat and radiation filtering and absorbing properties. This structure would permit the observer to observe the source in relative comfort because large quantities of heat would continually be being removed by the circulated fluid from the area of the transparent window.

Referring now to FIGURE 1, the radiation collector 7 is seen to comprise an outside pane 10 of substantially transparent or light transmitting material and an inside pane 11 of substantially transparent or light transmitting material. One quarter inch thick glass or plastic is satisfactory. The two panes are separated a short distance. A sealing member 12 is sealed between the edge surfaces of the sheets thus forming an enclosed space 14.

An inlet tube 15 is connected to the inner pane 11 near the lower edge of the enclosed space 14; and an outlet tube 16 is connected to the pane near the upper edge of the enclosed space. The inlet and outlet tube connections are sealed to prevent leakage.

The entire radiation collector is supported in an upright position by a support such as a window casement or other part of the building 20. The collector is most efficient where located in a wall which is exposed directly to the source of radiation 8. For solar heat radiation in this hemisphere, the radiation collector is most efficient when given a southern exposure.

A substantially transparent or light-transmitting heat absorbing fluid 9 is introduced into the enclosed space 14 by one or more inlet tubes such as inlet tube 15. The fluid is pumped into the enclosed space and moves upwardly filling the space 14 between the dual-panes and is removed by outlet tubes such as the outlet tube 16. In this fashion relatively cool fluid is circulated into the space 14 to replace the hot fluid. The newly introduced, relatively cool fluid is heated by heat radiated from the source of radiation 8.

The heated fluid from the radiation collector is then directed into a heat storage unit or heat exchanger unit which absorbs heat from the fluid so that the fluid is relatively cool when it again enters the collector.

The collector outlet pipe 16 (FIG. 2) is connected by a pipe 24 to a heat storage unit 25 which is in turn connected by a pipe 26 to a pump 27. The pump is connected by a pipe 28 and a valve 29 to the inlet pipe 15.

The heat storage unit 25 comprises several containers of Glauber's salt, or similar heat storing material. The heated fluid is brought into contact with the lower temperature containers and thus gives off heat to the material in the containers.

The pump outlet line 28 is connected to the valve 29 which controls the relative volume of fluid moving to the collector 7 and through pipe 31 to a heater unit 33. The heater unit 33 could comprise, for example, a series of small diameter pipes 33a in the building floor or walls, which radiate or otherwise dissipate the heat from the fluid passing through them into the room. The heater unit 33 is connected to the heat storage unit inlet by a line 34.

The most satisfactory results are achieved if the flow valve 29 is controlled by a control device 35 which responds to temperature changes within the building. Such temperature responsive valve controls are well known and available commercially. The temperature responsive control 35 for flow valve 29 responds to high temperatures by causing the valve to direct the major volume of fluid from the pump to the collector 7 and away from the heat dissipator unit 33 in the building. The heat is thereby stored in the storage unit 25. The temperature responsive control 35 for flow valve 29 would respond to low temperatures by causing the valve to direct the major volume of fluid from the pump to the heat dissipating unit 33. Heat is thereby removed from the storage unit 25.

The system just described is simple and the same fluid is used throughout. In operation, however, the volumes of fluid flowing in the collector 7 and in the heat dissipating unit 33 vary inversely with each other.

In order to independently control the volumes of fluid flowing in the collector 7 and in the heat dissipating unit 33, a second system shown in FIGURE 3, is provided. This second system has the heat dissipator 33 for the building and include a pump 40 and a valve 41. The dissipating system is independent of the absorbing system except that the fluid in the dissipating system circulates through the heat exchanger 25 to absorb heat energy from the heat storing medium.

The temperature responsive control 35 is connected to control both the flow valve 41 and the flow valve 29 and the volumes of fluid flowing in each system is thereby regulated.

It has been mentioned that a great number of techniques are available to enhance specific properties of the fluid chosen to circulate in the collector-dissipator. The additives could include:

(1) Substances for enhancing the heat absorbing property;

(2) Substances for enhancing the radiation filtering property;

(3) Substances to color the fluid;

(4) Substances such as colored solid particles, metal powders and flakes, and gas bubbles for particular effects.

In order to introduce and remove such substances an injection chamber 50, FIGURES 1 and 3, is connected by means of a valve 51 into the system. By opening the valve 51 pressurized gas in the head of the chamber forces substances placed therein into the line.

A filter or settling tank 53, FIGURE 3, is provided to remove injected substances from the system. By opening valve 55 and closing valve 56 the fluid flowing in pipe 16 will all pass the filter or settling tank 53. Other means of injecting and removing substances from the system will occur to persons skilled in the art.

Radiated heat raises the heat content of the fluid 9 flowing in the enclosed space 14, FIGURE 1. The fluid loses this heat while between the panes mainly by the process of conduction to the air on either side of the window.

If heat is lost by conduction to the air inside the building, this is not objectionable, but if heat is lost to the outside air, this is objectionable because this decreases efficiency. This objection is overcome by providing a second enclosed space 60, FIGURE 1.

The second enclosed space 60 is achieved by sealing a light transmitting pane 61 to the pane 10 by using a sealing member 62. The enclosed space 60 is evacuated so that no air remains to conduct the heat from the fluid in space 14 to the outside. With this arrangement, most of the heat energy lost by the hot fluid in the collector-dissipator will be lost, not to the outside, but to the room.

It is well known that during cold months, as much heat will be lost through a single window as is lost through an entire wall of an ordinary residence. These standard windows are very cold and cause the room to be cold in the area just inside the window. With the present invention, the windows will be transparent and warm and there will be no appreciable temperature variation at any point in the residence.

It will be observed that the expanse of windows disclosed herein can conduct refrigerated fluids. This alternative would provide a building which could be easily maintained at a cool inside temperature relative to a hot outside temperature because solar heat energy would merely warm the cold fluid and then be dissipated at the refrigerator. This then would prevent such solar energy from warming the inside of the building even though large window areas are exposed to the sun.

Although this disclosure is offered for public dissemination and is detailed to ensure adequacy and aid understanding, this is not intended to prejudice that purpose of a patent which is to cover each new inventive concept therein, no matter how it may later be disguised by variations in form or the additions of refinements. The claims which follow are intended as the chief aid toward this purpose, and it is these that meet the requirement of pointing out the parts, improvements, or combinations in which the inventive concepts are found.

I claim:

1. Transparent room temperature regulating apparatus for installation in a window opening in a building wall comprising: a quantity of transparent liquid having a particular heat content, a liquid container adapted to occupy a window opening and having an inner and an outer transparent wall with the liquid occupying the space between said transparent walls, means for injecting a substance having a predetermined effect on the solar heat energy absorbing properties of the liquid, and heat exchange means controlled in response to room temperature changes and in communication with said liquid for changing the heat content of said liquid.

2. The method of collecting and distributing solar energy in a building which comprises: forming in a wall of the building exposed to the sun a transparent dual-paned window; pumping a quantity of heat conductive substantially transparent fluid through a closed circuit including the space between the window panes; injecting a transparency affecting substance into the fluid; and moving a portion of the pumped fluid into heat exchange relation with a heat dissipater conveniently located within said building.

3. The method according to claim 2 including adjusting the amount of said fluid moved into said heat exchange relation automatically in response to the temperature within the building.

4. A solar heating system for a building comprising: at least one building window exposed to solar radiation, said window comprising a pair of substantially transparent sheet members and spacing means positioned along the peripheral edges of said sheet members and sealed therebetween to form an enclosed space between said sheet members; at least one fluid inlet connection communicating with said space; at least one fluid outlet connection communicating with said space; a heat dissipating unit for said building having a fluid inlet and a fluid outlet connection; a fluid conducting system connected to the outlet connection of said unit and the inlet connection of said space and connected to the inlet connection of said unit and to the outlet connection of said space; a fluid pump in said system; a quantity of substantially transparent heat conductive fluid for substantially filling said space; and means connected to said system for introducing a substance having solar radiation absorbing properties into said fluid; said window and said fluid conducting system for communicating absorbed heat to said heat dissipating unit.

5. A solar heating system according to claim 4 which includes means in said conducting system operable to control the volume of fluid circulated.

6. A solar heating system for a building comprising: at least one wall of said building exposed to solar radiation, said wall comprising a pair of substantially transparent sheet members connected to spacing means to provide an enclosed space therebetween; a quantity of substantially transparent heat conductive fluid; a first piping system containing said fluid connected at at least two points to said space and including a heat exchanger, a valve, and a pump for circulating said fluid through said space; means communicating with said first piping system for introducing into said fluid a substance for modifying the radiation-absorbing properties of said fluid; a heat dissipating unit conveniently located in said building; a second piping system containing said fluid connected at at least two points to said unit and including said heat exchanger, said valve and said pump for circulating said fluid through said unit.

7. A solar heating system for a building comprising: at least one wall of said building exposed to solar radiation, said wall comprising a pair of substantially transparent sheet members which are connected to spacing means for providing an enclosed space therebetween; a quantity of substantially transparent first heat conductive fluid; a first piping system containing said first fluid connected at at least two points to said space and including a heat exchanger, a valve, and a pump for circulating said first fluid through said space; means communicating with said first piping system for introducing into said first fluid a substance for modifying the radiation-absorbing properties of said first fluid; a heat dissipating unit conveniently located in said building; a quantity of second heat conductive fluid; a second piping system containing said second fluid connected at at least two points to said unit and including a second valve, said heat exchanger and a second pump for circulating said second fluid through said unit.

8. A solar heating system according to claim 7 which includes control means connected to each of said valves for regulating the volume of fluid moving in the respective piping system.

References Cited in the file of this patent
UNITED STATES PATENTS

| | | |
|---|---|---|
| 2,396,338 | Newton | Mar. 12, 1946 |
| 2,425,797 | Gillespie | Aug. 19, 1947 |
| 2,439,553 | Winn | Apr. 13, 1948 |
| 2,489,751 | Candler | Nov. 29, 1949 |
| 2,537,011 | Aparicio | Jan. 9, 1951 |
| 2,544,474 | Swanton | Mar. 6, 1951 |
| 2,559,871 | Gay | July 10, 1951 |
| 2,931,578 | Thompson | Apr. 5, 1960 |